No. 850,991. PATENTED APR. 23, 1907.
F. E. ABBOTT.
DOUGH MIXING AND KNEADING MACHINE.
APPLICATION FILED MAY 12, 1906.
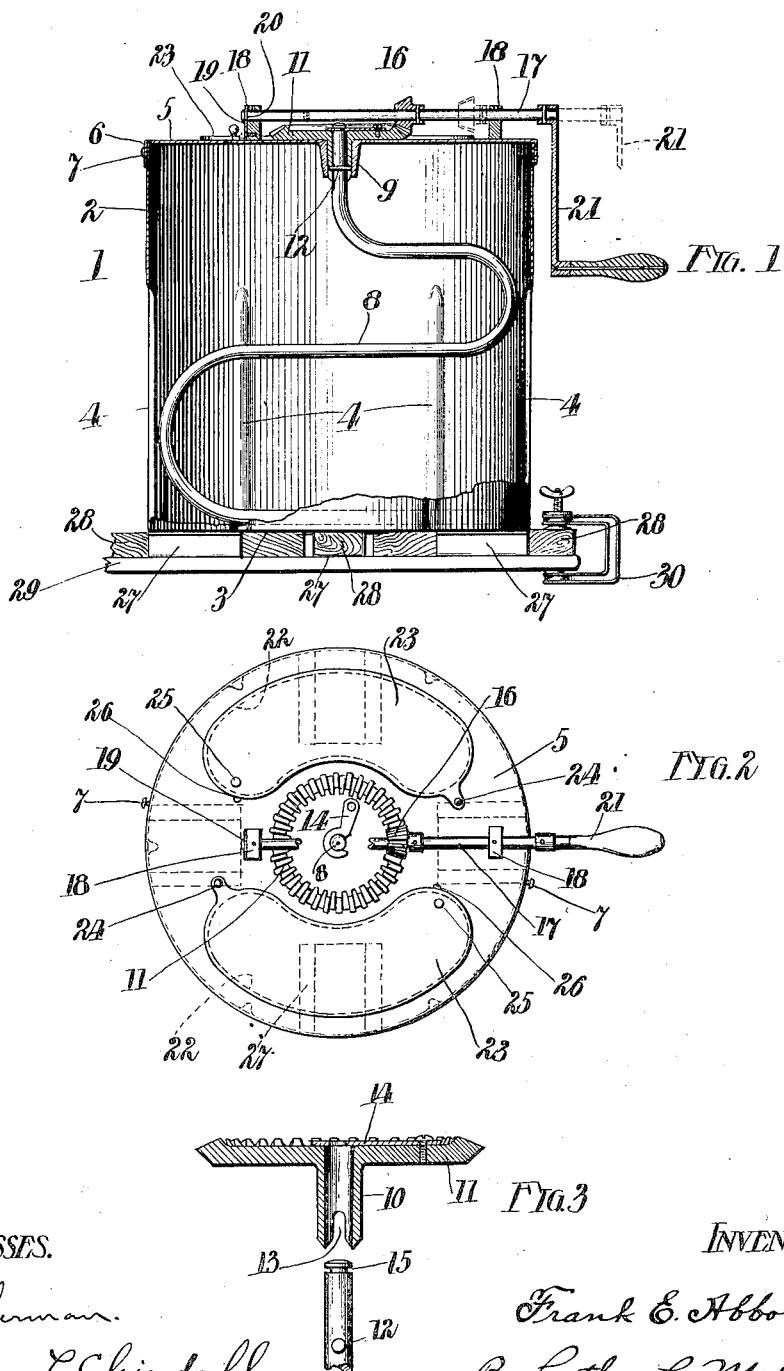
WITNESSES.
INVENTOR.
Frank E. Abbott
By Luther L. Miller
ATTY

UNITED STATES PATENT OFFICE.

FRANK E. ABBOTT, OF BUFFALO, MINNESOTA, ASSIGNOR TO THE BUFFALO MANUFACTURING COMPANY, OF BUFFALO, MINNESOTA, A CORPORATION OF MINNESOTA.

DOUGH MIXING AND KNEADING MACHINE.

No. 850,991.　　　　Specification of Letters Patent.　　　　Patented April 23, 1907.

Application filed May 12, 1906. Serial No. 316,425.

*To all whom it may concern:*

Be it known that I, FRANK E. ABBOTT, a citizen of the United States, residing at Buffalo, in the county of Wright and State of Minnesota, have invented certain new and useful Improvements in Dough Mixing and Kneading Machines, of which the following is a specification.

One of the objects of this invention is the production of a dough mixing and kneading machine provided with an improved actuating means comprising an operating-crank located at the side of the machine and arranged for rotation in a vertical plane.

Another object of the invention is the provision, in a machine of the character mentioned, of improved means for permitting the ready removal of the dough from the machine.

The invention further relates to the various improvements in dough mixers and kneaders hereinafter set forth.

In the accompanying drawings, Figure 1 is a vertical central sectional view through a dough mixing and kneading machine embodying the features of my invention. Fig. 2 is a top plan view of said machine. Fig. 3 is a detail view of one of the gears comprised in the actuating mechanism and the upper end of the kneading-shaft.

The embodiment herein shown of my invention comprises a receptacle 1 for the materials to be operated upon, said receptacle in this instance consisting of a sheet-metal cylinder having side walls 2 and a bottom wall 3. Upon the inner sides of the walls 2 is a plurality of panels or ribs 4, crimped or pressed from the material of said walls for a purpose to appear later herein. The upper end of the receptacle 1 is closed by a cover 5, having an annular peripheral flange 6, adapted to fit over the upper edge of the side walls 2 of the receptacle. For convenience in removing the dough from the machine the cover 5 is removably secured in place, the means herein employed for that purpose consisting of set-screws 7, seated in diametrically opposite openings in the flange 6 and adapted to bear upon the side walls 2.

The device for mixing and kneading the dough consists of a member 8, in this instance formed of a round rod bent to provide a plurality of loops extending substantially from side to side of the receptacle 1, the lowermost part of said member lying parallel with and close to the bottom 3. The member 8 is rotated by means of gearing supported upon the cover 5; but it is readily detachable from its driving mechanism, as will hereinafter appear, in order that it may be left in the dough when the cover 5 is removed and the dough and the mixing member together removed from the receptacle. A vertically-extending bearing-sleeve 9 is formed integral with the cover 5 for the reception of the hub 10 of a gear-wheel 11. The hub 10 of said gear-wheel is tubular and is adapted to fit upon the upper end of the kneading member 8. A driving engagement between the gear-wheel 11 and the kneading member 8 is obtained by means of a pin 12, fixed in the member 8, the ends of said pin projecting into diametrically opposite slots 13 in the hub 10 of said gear-wheel. The slots 13 are open at their lower ends to permit of separating the gear-wheel 11 and the kneading member 8 by a simple longitudinal movement. Said gear-wheel and kneading member are normally held from longitudinal movement with relation to each other by a hooked latch 14, pivoted upon the gear-wheel and adapted to engage an annular groove 15 in the projecting upper end of the member 8. The gear-wheel 11 is driven by a pinion 16, fixed upon a horizontal shaft 17, rotatably supported in bearing-lugs 18, formed upon the cover 5. The shaft 17 is releasably held from endwise movement by a hooked latch 19, pivoted to one of the bearing-lugs 18 and adapted to engage a peripheral groove 20 in one end of said shaft. The opposite end of the shaft 17 extends beyond the side of the receptacle 1 and bears the fixed crank 21, arranged for rotation in a vertical plane.

Access to the interior of the receptacle 1 when the cover 5 is in place is had through openings 22 in said cover, said openings being arranged to be closed by slides 23, pivoted at 24 to the cover 5 and adapted to be moved by means of the finger-knobs 25. 26 are stop-lugs on the cover 5 for limiting the pivotal movement of the slides 23 in one direction.

Various means may be used for attaching the herein-described dough mixer and kneader to a table or other support. The attaching means herein shown comprises rectangular standing loops 27, of sheet metal or other suitable material, secured to the bottom 3 of the receptacle 1 in any preferred way. Into these loops may be inserted wooden blocks 28, the projecting ends of which may be secured to a table-top 29 by means of clamps 30 of any common or preferred construction.

In use the cover 5, with the kneading member 8 attached thereto, having been removed from the receptacle 1, the flour and other ingredients are placed in said receptacle. The cover 5 is then replaced and the crank 21 rotated to revolve the mixing and kneading member 8. Being located at the side of the machine and rotating in a vertical plane, the crank 21 can be turned with less effort than if located on top of the receptacle and revolving in a horizontal plane. In its rotation the member 8 thoroughly mixes and kneads the dough. Bodily rotation of the mass of dough is prevented by the ribs 4. When the dough has been sufficiently kneaded, the member 8 is disengaged from the actuating mechanism by pivotally moving the latch 14 to release said member, whereupon the cover 5, with the gearing in position thereon, is lifted off and set aside. The dough may now be lifted out, together with the member 8, and said member separated from the dough. It has been found in practice that it is easier to remove the kneading member 8 from the dough if said member be first disconnected from the cover 5.

I claim as my invention—

1. In a dough mixer and kneader, in combination, a receptacle; a removable cover therefor having a downwardly-extending bearing-sleeve formed upon its under side; a kneading member; a gear-wheel rotatably supported upon the upper side of said cover in a horizontal position, and provided with a tubular hub adapted to lie in said bearing-sleeve and to receive one end of said kneading member; the lower end of said hub having a notch therein; a pin fixed in said kneading member adapted to enter said notch for releasably connecting said gear-wheel and said kneading member; and means for rotating said gear-wheel.

2. In a dough mixer and kneader, in combination, a receptacle; a removable cover therefor; a kneading member; a gear-wheel rotatably supported by said cover, said gear-wheel being provided with a tubular hub having a slot in its lower end, the upper portion of said kneading member being adapted to enter said tubular hub and having a projection thereon adapted to lie in said slot, the upper end of said kneading member projecting above said gear-wheel and having a groove therein; a latch pivoted on said gear-wheel and adapted to engage the grooved upper end of said kneading member; and means for rotating said gear-wheel.

3. In a dough mixer and kneader, in combination, a receptacle; a cover therefor; bearings on said cover; a crank-shaft supported in said bearings; a latch adapted to engage said crank-shaft for preventing endwise movement thereof; and a mixing and kneading device actuated by said crank-shaft.

4. In a dough mixer and kneader, in combination, a receptacle; a cover for said receptacle; bearing-lugs upon the upper side of said cover; a horizontal crank-shaft rotatably and slidably supported in said bearing-lugs, said shaft having a peripheral groove therein; a latch pivoted to one of said bearing-lugs and adapted to engage said groove; a gear fixed to said shaft; a gear supported on said cover and meshing with said first-mentioned gear; and a kneading member fixed to said last-mentioned gear.

5. In a dough mixer and kneader, in combination, a receptacle; a removable cover therefor, having a downwardly-extending bearing-sleeve; a kneading member; a gear-wheel rotatably supported upon the upper side of said cover in a horizontal position and provided with a tubular hub adapted to lie in said bearing-sleeve and to receive one end of said kneading member, said upper end of said kneading member having a peripheral groove therein; a latch pivoted on said gear-wheel adapted to enter said groove; and means supported by said cover for rotating said gear-wheel.

FRANK E. ABBOTT.

Witnesses:
BERNARD O. BONSTROM,
LESTER BARTLETT.